(12) United States Patent
Feitelberg et al.

(10) Patent No.: US 6,632,257 B1
(45) Date of Patent: Oct. 14, 2003

(54) FUEL COMPOSITION AND METHOD FOR EXTENDING THE TIME BETWEEN TURBINE WASHES WHEN BURNING ASH BEARING FUEL IN A TURBINE

(75) Inventors: Alan S. Feitelberg, Niskayuna, NY (US); Vinod Kumar Pareek, Niskayuna, NY (US); Alan Whitehead, Charlton, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/564,312

(22) Filed: May 3, 2000

Related U.S. Application Data
(60) Provisional application No. 60/134,183, filed on May 13, 1999.

(51) Int. Cl.[7] .............................. C10L 1/12; C10L 1/24; C10L 10/04
(52) U.S. Cl. .............................. 44/370; 44/457; 44/458; 44/603
(58) Field of Search .......................... 44/370, 457, 458, 44/603

(56) References Cited

U.S. PATENT DOCUMENTS

| | | | |
|---|---|---|---|
| 2,949,008 A | * 8/1960 | Rocchini et al. ........... 60/39.46 |
| 3,817,722 A | 6/1974 | Scott .............................. 44/76 |
| 3,980,449 A | 9/1976 | Zetlmeisl et al. | |
| 3,994,699 A | 11/1976 | Scott .............................. 44/76 |
| 4,047,875 A | * 9/1977 | May et al. ...................... 431/3 |
| 4,129,409 A | 12/1978 | Young | |
| 4,131,433 A | 12/1978 | Scott .............................. 44/51 |
| 4,659,339 A | * 4/1987 | May et al. ..................... 44/320 |
| 5,561,977 A | 10/1996 | Harada et al. | |

FOREIGN PATENT DOCUMENTS

| | | |
|---|---|---|
| DE | 2648741 | 10/1976 |
| GB | 1567637 | 11/1975 |

\* cited by examiner

*Primary Examiner*—Cephia D. Toomer
(74) *Attorney, Agent, or Firm*—Armstrong Teasdale LLP

(57) ABSTRACT

The addition of a magnesium compound to an ash bearing fuel results in a reduction in the formation of deposits in the turbine and extending the interval between turbine washes when burning the ash bearing fuel in a turbine compared to burning the ash bearing fuel in a turbine without the addition of a magnesium compound. The additive is desirably effective with ash bearing fuel having less than 0.5 ppm vanadium by weight, less than 1 ppm sodium and potassium combined by weight, and greater than about 25 ppm ash by weight or greater than 2 ppm calcium by weight. The additive is blended with the ash bearing fuel to give a mass ratio of magnesium to ash of between about 0.5 to 1 and about 3 to 1, and desirably about 1 to 1 on a mass basis after mixing.

40 Claims, 1 Drawing Sheet

FUEL COMPOSITION AND METHOD FOR EXTENDING THE TIME BETWEEN TURBINE WASHES WHEN BURNING ASH BEARING FUEL IN A TURBINE

RELATED APPLICATION

This application claims the benefit of U.S. Provisional Application No. 60,134,183, filed May 13, 1999, entitled "Method for Extending Turbine Wash Internal When Burning Ash Bearing Fuels," the contents of which are hereby incorporated in its entirety by reference.

BACKGROUND OF THE INVENTION

This invention relates generally to fuel compositions for combustion turbines, and more particularly, to fuel compositions and methods for extending the time between turbine washes when burning ash bearing fuels.

When combusted in a turbine, various inorganic constituents (ash) in a fuel can affect turbine operation particularly over extended periods of time. Certain constituents in a fuel can cause corrosion of the various parts of the turbine. Other constituents in a fuel can form non-corrosive deposits on the various parts of the turbine. Deposits are often periodically removed with a standard turbine wash cycle.

For example, sodium, potassium, and vanadium are of concern in hot corrosion. Turbine manufacturers typically recommend less than 1 ppm (parts per million) by weight of sodium and potassium combined, less than 0.5 ppm by weight of vanadium, and less than 5 ppm other trace metals by weight. In particular, vanadium in a concentration greater than 0.5 ppm by weight forms low melting point vanadium compounds which have been implicated in hot corrosion. Magnesium compounds have been added to fuels having a vanadium content greater than 0.5 ppm by weight to reduce vanadium corrosion in gas turbines. The magnesium compounds react with vanadium to form solid magnesium vanadates, capturing the vanadium in an inert chemical state.

In contrast, other constituents in the fuel form deposits on and foul various components such as turbine nozzles and buckets in the turbine hot gas path. Over extended periods of operation, the deposits can build up and partially block the flow of hot gas through the turbine. A typical turbine can tolerate a ten-percent blockage of the flow of hot gas before the turbine must be taken off-line for cleaning. Failure to remove the deposits eventually leads to compressor surge, i.e., extreme vibrations, which causes a shutdown of the turbine.

Turbine manufacturers typically recommend that the maximum ash content by the fuel be no more than 50 ppm by weight. Calcium, for example, is known to form relatively hard to remove deposits, with the hardness of the deposits increasing with increased firing temperatures; Of the total ash content, turbine manufacturers typically recommend that the content of calcium be no more than 2 ppm by weight in true distillate fuel oils, and no more than 10 ppm by weight in ash bearing fuels, e.g., crude and blended residual fuels and heavier residual fuels.

In order to meet these recommended levels, undesired inorganic constituents in ash burning fuels for use in turbines are often removed from the fuel by water washing and filtration. However, there are ash bearing fuels which cannot be made to comply with the manufacturer's fuel specification, even with multiple stages of water washing.

There is a need for fuel additives which will extend the wash interval, and improve the wash effectiveness, when burning ash bearing fuels that contain ash constituents which are generally not corrosive, but which form hard-to-remove deposits.

SUMMARY OF THE INVENTION

The present invention, in one aspect, provides a composition which includes an ash bearing fuel having less than 0.5 ppm vanadium by weight, at least one of greater than about 25 ppm ash by weight and greater than 2 ppm calcium by weight, and an additive comprising a magnesium compound.

In a second aspect, a liquid petroleum ash bearing fuel composition for extending the time between turbine washes when burning ash bearing fuel includes an ash bearing fuel having less than 0.5 ppm vanadium by weight, less than 1 ppm sodium and potassium combined by weight, at least one of greater than about 25 ppm ash by weight and greater than 2 ppm calcium by weight, an additive comprising a magnesium compound, and wherein a weight ratio of magnesium to ash is greater than about 0.5 to 1.

In a third aspect, a method for operating a turbine includes providing an ash bearing fuel comprising less than 0.5 ppm vanadium by weight, and at least one of greater than about 25 ppm ash by weight and greater than 2 ppm calcium by weight, providing an additive comprising a magnesium compound, mixing the ash bearing fuel and the additive and burning the mixture of the ash bearing fuel and the additive in the turbine.

In a fourth aspect, a method for extending the time between turbine washes when burning ash bearing fuel in a turbine includes providing an ash bearing fuel having less than 0.5 ppm vanadium by weight, less than 1 ppm sodium and potassium combined by weight, and at least one of greater than about 25 ppm ash by weight and greater than 2 ppm calcium by weight, providing an additive comprising a magnesium compound, mixing the ash bearing fuel and the additive so that a weight ratio of the magnesium to ash is greater than about 0.5 to 1, and burning the mixture of the ash bearing fuel and the additive in the turbine.

Advantageously, the addition of an additive comprising magnesium to ash bearing fuel also improves the effectiveness of a standard turbine wash cycle when burning the ash bearing fuel in a turbine.

DETAILED DESCRIPTION OF THE INVENTION

Figure 1:
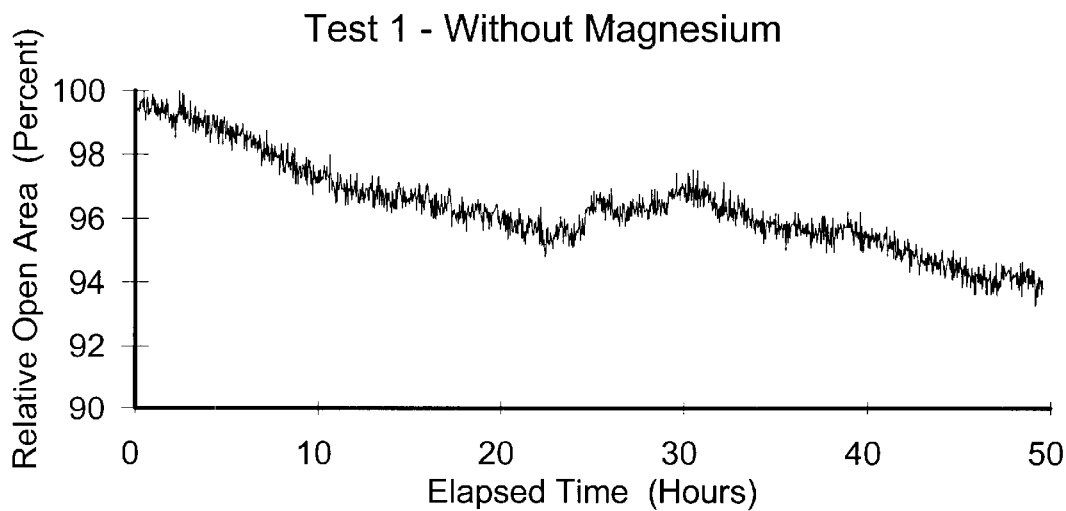
FIG. 1 is a graph of the relative open area of the first stage of a turbine simulator over time when burning an ash bearing fuel without the addition of an additive containing a magnesium compound.

It has been found that an additive containing a magnesium compound added to an ash bearing fuel extends the interval between turbine washes when burning the ash bearing fuel in a turbine compared to when burning the ash bearing fuel without the addition of the additive. The addition of the magnesium compound also improves the effectiveness of a standard turbine wash cycle when burning the ash bearing fuel. In particular, the present invention is desirably directed to ash bearing fuels having a vanadium content less than 0.5 ppm (parts per million) by weight, i.e., fuels which do not require the addition of a magnesium compound to inhibit vanadium corrosion.

As used herein, the term "ash bearing fuel" refers to a fuel having undesirable constituents, i.e., ash, in the fuel which are generally related the formation of deposits and/or to corrosion, which include but are not limited to sodium, potassium, calcium, lead, iron, nickel, and does not include the additive.

The present invention is directed to ash bearing fuel such as liquid petroleum distillate fuel oil or crude oil having less than 0.5 ppm vanadium by weight, less than 1 ppm by weight of sodium and potassium combined, and at least one of greater than about 25 ppm ash by weight and greater than 2 ppm calcium by weight. Typically, with fuel oil having greater than 25 ppm ash by weight or greater than 2 ppm calcium by weight, water washing and/or filtration are preformed to reduce the ash content of the fuel before burning the fuel in a gas turbine.

The addition of the magnesium compound to ash bearing fuel is desirably effective to extend the interval between wash intervals particularly when burning ash bearing fuels having an ash content greater than 50 ppm by weight, and/or a calcium content greater than 10 ppm by weight.

The additive for use in the present invention includes a magnesium compound, either an oil soluble compound, e.g., magnesium sulfonate, or a water soluble compound, e.g., magnesium sulfate. From the present description, it will be appreciated by those skilled in the art that many other chemical compounds containing magnesium may also be used.

The additive is blended with the ash bearing fuel to give a mass ratio of magnesium to ash of between about 0.5 to 1 and about 3 to 1, and desirably about 1 to 1 on a mass basis after mixing. Accordingly, the magnesium added to the fuel is typically in the range between about 10 ppm by weight and about 1500 ppm by weight, and desirably in the range between about 25 ppm and about 250 ppm by weight.

Test Results

In particular, it has been found that the addition of an additive containing a magnesium compound to an ash bearing fuel decreases the durability of the deposits that form on the various parts of the turbine when burning the ash bearing fuel in a turbine compared to deposits formed without the addition of the magnesium compound when burning the ash bearing fuel. The decreased durability of deposits results in the deposits spontaneously breaking off which extends the interval between turbine washes. In addition, the deposits that remain are more easily removed by a standard turbine wash cycle.

Two tests were conducted, one with just an ash bearing fuel, e.g., without the addition of a magnesium compound, and the other with an ash bearing fuel and the addition of a magnesium compound. The tests were conducted using a turbine simulator which included a combustor liner and flow sleeves, a liquid-fuel only fuel nozzle assembly, a combustor liner and hinged end cover, two first stage nozzle segments which formed three passages, and a transition piece disposed between the combustor liner and the two first stage nozzle segments.

The ash bearing fuel composition used in the two tests included No. 2 oil and additional ash bearing constituents as discussed below. The initial composition of the No. 2 oil is set forth below in Table 1.

TABLE 1

| Constituents | Amount by weight |
|---|---|
| Ash | 10 ppm |
| Sodium | 0.2 ppm |
| Nickel | <0.1 ppm |
| Iron | 0.1 ppm |
| Calcium | 0.2 ppm |

To simulate an ash bearing fuel, calcium, iron, and nickel were added to the No. 2 oil using a commercially available oil-soluble fuel additive having 1.05 percent by weight calcium, 0.75 percent by weight iron, and 1.65 percent by weight nickel. The calcium was in the form of calcium sulfonate, and the iron and nickel were in the form of carboxylates.

The No. 2 oil and the fuel additive were combined to simulate an ash bearing fuel having a calcium concentration of about 42 ppm by weight, an iron concentration of about 30 ppm by weight, and a nickel concentration of about 67 ppm by weight. The resulting simulated ash bearing fuel included a total ash content of about 139 ppm by weight.

Except for the addition of the magnesium compound to the fuel during the second test, the two tests were nominally identical. For the second test, commercially available magnesium containing fuel additive was used containing 2.5 percent magnesium by weight, e.g., magnesium in the form of magnesium sulfonate in a petroleum distillate. The concentration of the magnesium in the blended fuel was set to be equal to about the sum of the iron and nickel concentrations on a weight basis, e.g., about 93 ppm by weight.

The ratio of magnesium to total ash was about 0.65. An air temperature of about 700 degrees Fahrenheit and a combustor exit temperature of about 2,140 degrees Fahrenheit were selected to simulate a typical turbine operating condition.

The test conditions are summarized and set forth below in Table 2.

TABLE 2

| Parameter | Test 1 | Test 2 |
|---|---|---|
| Nominal Test Duration (hours) | 50 | 100 |
| Air Temperature (EF) | 701 ± 3 | 703 ± 2 |
| Fuel | No. 2 Oil | No. 2 Oil |
| Combustor Exit Temperature (EF) | 2138 ± 15 | 2139 ± 14 |
| Fuel Ca Concentration (ppmw) | 42 ± 6 | 43 ± 4 |
| Fuel Fe Concentration (ppmw) | 30 ± 4 | 31 ± 3 |
| Fuel Ni Concentration (ppmw) | 66 ± 9 | 68 ± 6 |
| Fuel Mg Concentration (ppmw) | 0 | 93 ± 11 |
| $1^{st}$ Stage Nozzle Cooling Air Flow ($lb_m/s$) | 1.3 ± 0.02 | 1.2 ± 0.03 |
| Combustion Air Flow ($lb_m/s$) | 11.5 ± 0.2 | 11.3 ± 0.2 |

The turbine simulator was based on a MS6001B gas turbine manufactured by General Electric Power Systems. The total mass flow through the combustor was about third of the full flow in the MS6001B gas turbine. From the present invention, it will be appreciated by those skilled in the art that these test results can be readily scaled to a full scale turbine operating at full mass flow.

The relative open area was found to be a reliable and reproducible measure of first stage nozzle effective area in the turbine simulator. As expected, as deposits built up on the nozzle airfoils, the relative open area decreases. Relative open area of the first stage turbine nozzle was monitored continuously throughout the tests, and determined from the measured combustor air flow rate, combustor air temperature, and combustor pressure, as follows:

$$\text{Relative Open Area } \alpha \ \frac{\text{Combustor Air Flow Rate} \times \sqrt{T_{combustion\ air}}}{P_{combustion\ air}}$$

Figure 2:
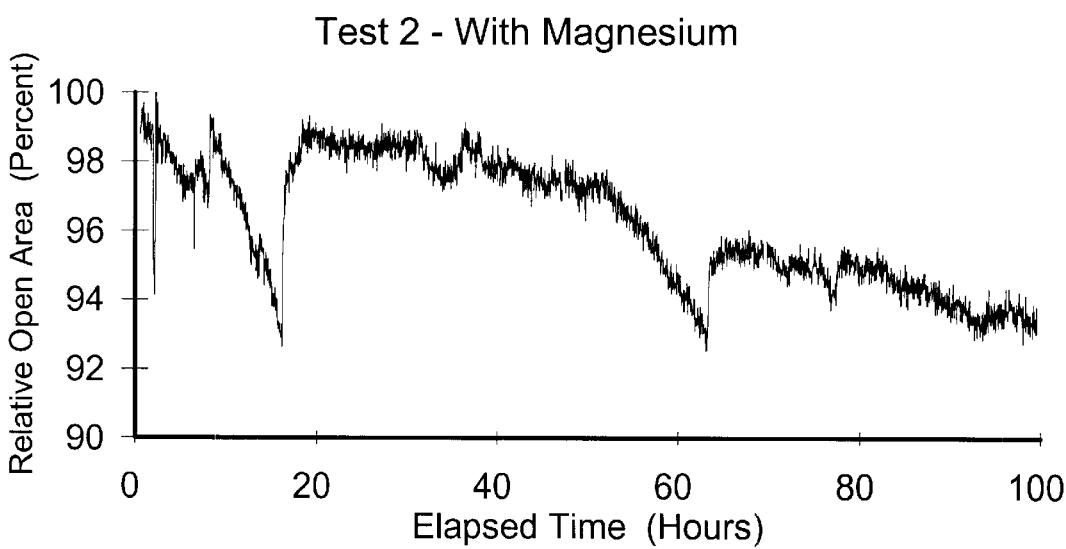
FIG. 2 is a graph of the relative open area of a first stage of a turbine simulator over time when burning an ash bearing fuel with the addition of an additive containing a magnesium compound.

A comparison of FIGS. 1 and 2 illustrate the relative open area in percent of the first stage over time for Test 1 (50 hours) and Test 2 (100 hours), respectively. From observation of FIGS. 1 and 2, the addition of the magnesium (Test 2) to the ash bearing fuel substantially slowed the overall rate of deposition and blockage of the first stage nozzle compared to the ash burning fuel not including magnesium (Test 1).

The overall fouling rate is determined from, for example, the slope of a best-fit line for the graphs shown in FIGS. 1 and 2. For Test 1, the relative open area decreased at a rate of about 9.0 percent per 100 hours.

For Test 2, with the addition of magnesium, the open relative area decreased at a rate of about 5.2 percent per 100 hours. The addition of the magnesium compound extended the time between washes to about 192 hours from about 111 hours.

From the present description, it will be appreciated by those skilled in the art that the incorporation of the additive comprising a magnesium compound is effective in extending the wash interval when burning ash bearing fuels having ash concentrations over a range of about 25 ppm to about 500 ppm. For ash bearing fuels having similar ash constituents, similar ratios among the various constituents, but different total concentrations of the ash constituents in the ash bearing fuels, the projected wash interval will be longer for the ash bearing fuel having less ash content and shorter for ash bearing fuel having a greater ash content. For example, ash bearing fuel having similar ash constituents, similar ratios among the various constituents, but a total ash content less by a factor of ten than the total ash content described in Tests 1 and 2 (e.g., an ash bearing fuel having 4.2 ppm calcium by weight, 3.0 ppm iron by weight, and 6.7 ppm nickel per weight) would result in a projected wash interval ten times longer or about every 1,900 hours of operation with the addition of the additive compared and about every 1,100 hours of operation when burning the ash bearing fuel without the additive.

The addition of the magnesium compound qualitatively altered the time evolution of the relative open area. As shown in FIG. 1, during Test 1, the open area decreased in a fairly steady fashion. This steady decrease is reflected in the relatively good fit of the open area over time to a straight line. However, there was significantly greater variation in relative open area over time during Test 2, and a linear regression over the entire test is not as good. In particular, there were two distinct time periods, from about 8.2 hours to about 16.2 hours and from about 52.5 hours to about 63.2 hours, during which the relative open area decreased rapidly. At the end of each of these time periods the relative open area increased suddenly, then began to decrease again, but at a much slower rate. The sudden increases in the relative open area did not correlate with changes in any other operating conditions.

It is believed the sudden increases in the relative open area occurred when fragile deposits broke off of the nozzle airfoils. For Test 2, the deposits on the leading edge of both the left and right airfoils built up to form a knife-edge. Upon review, a portion of the leading edge of the right airfoil was bare, and was probably exposed when a portion of the deposits broke off. The edges of the bare area are sharply delineated, as might be expected if a brittle deposit had broken off, and new material had not yet had time to deposit.

Samples collected from the combustor liner and transition piece after Test 1 contained $CaSO_4$ with $NiFe_2O_4$ spinel and NiO present as minor phases. About 50 percent of each sample was found to be water soluble. Samples from the first stage nozzle segments after Test 1 contained the same three phases, and also contained a new minor phase: $CaFe_2O_5$ spinel which was hard and fairly uniform. The formation of additional spinels is significant, because spinels are known to be harder to remove with a standard wash cycle. Only about 37 percent of the first stage nozzle deposits collected from Test 1 were found to be water soluble.

Samples collected from the combustor liner and transition piece after Test 2 contained four identifiable phases: $(Mg, Ni)O$, $CaMg_3(SO_4)_4$, $CaSO_4$, and $NiFe_2O_4$. The major phase was $(Mg, Ni)O$, a combination of two separate but similar phases: $MgO$ and $MgNiO_2$. About 50 percent of the combustor liner deposit, but only 40 percent of the transition piece deposit, was found to be water soluble. Samples collected from the first stage nozzle segments after Test 2 contained three of these four phases: $CaMg_3(SO_4)_4$ was absent. About 32 percent of the first stage nozzle segment deposit was water soluble.

The mechanism through which magnesium extends the wash interval (by making the deposits more fragile) is fundamentally different from the mechanism through which magnesium inhibits vanadium corrosion by reacting with vanadium to form magnesium vanadates.

In addition, a standard turbine wash cycle was simulated after each test. Hot, 150–180 degrees Fahrenheit, water was injected into the test stand through the atomizing air circuit at a flow rate of about 25 GPM (gallons per minute) for about 10 minutes to about 15 minutes. The turbine simulator was subsequently refired and then inspected.

The open area was measured during the refire to determine the effectiveness of the wash cycle after both Test 1 and Test 2. The wash cycle conducted after Test 1 recovered 40 percent of the lost open area, while the wash cycle conducted after Test 2 recovered 54 percent of the lost open area. The improved wash effectiveness is another benefit afforded through the addition of a magnesium compound to the ash bearing fuel.

Thus, while various embodiments of the present invention have been illustrated and described, it will be appreciated to those skilled in the art that many changes and modifications may be made thereunto without departing from the spirit and scope of the invention.

What is claimed is:

1. A composition comprising:
    an ash bearing fuel having less than 0.5 ppm vanadium by weight and at least one of greater than about 25 ppm ash by weight, and greater than zero ppm ash by weight and greater than 2 ppm calcium by weight; and
    an additive comprising a magnesium compound wherein a resulting weight ratio of magnesium to ash is greater than about 0.5 to 1.

2. The composition of claim 1 wherein said ash bearing fuel comprises greater than about 25 ppm ash by weight and greater than 2 ppm calcium by weight.

3. The composition of claim 1 wherein said ash bearing fuel comprises greater than about 50 ppm ash by weight.

4. The composition of claim 1 wherein said ash bearing fuel comprises greater than about 10 ppm calcium by weight.

5. The composition of claim 1 wherein said ash bearing fuel comprises less than 1 ppm sodium and potassium combined by weight.

6. The composition of claim 1 wherein said weight ratio is less than about 3 to 1.

7. The composition of claim 1 wherein said weight ratio is about 1 to 1.

8. The composition of claim 1 wherein said composition comprises between about 10 ppm and about 1,500 ppm magnesium by weight.

9. The composition of claim 8 wherein said composition comprises between about 25 ppm and about 250 ppm magnesium by weight.

10. The composition of claim 1 wherein said ash bearing fuel comprises ash comprising substantially calcium, iron, and nickel.

11. The composition of claim 1 wherein said magnesium compound comprises at least one of a magnesium sulfonate compound and a magnesium sulfate compound.

12. The composition of claim 1 wherein said ash bearing fuel comprises a liquid petroleum based fuel.

13. A liquid petroleum ash bearing fuel composition for extending the time between turbine washes when burning ash bearing fuel, said ash bearing fuel composition comprising:
   an ash bearing fuel having less than 0.5 ppm vanadium by weight, less than 1 ppm sodium and potassium combined by weight, and at least one of greater than about 25 ppm ash by weight, and greater than zero ppm ash by weight and greater than 2 ppm calcium by weight;
   an additive comprising a magnesium compound; and
   wherein a weight ratio of magnesium to ash is greater than about 0.5 to 1.

14. The fuel composition of claim 13 wherein said ash bearing fuel comprises greater than about 25 ppm ash by weight and greater than 2 ppm calcium by weight.

15. The fuel composition of claim 13 wherein said ash bearing fuel comprises greater than about 50 ppm ash by weight.

16. The fuel composition of claim 13 wherein said ash bearing fuel comprises greater than about 10 ppm calcium by weight.

17. The fuel composition of claim 13 wherein said weight ratio is less than about 3 to 1.

18. The fuel composition of claim 13 wherein said weight ratio is about 1 to 1.

19. The fuel composition of claim 13 wherein said ash bearing fuel comprises ash comprising substantially calcium, iron, and nickel.

20. The fuel composition of claim 13 wherein said magnesium compound comprises at least one of a magnesium sulfonate compound and a magnesium sulfate compound.

21. A method for operating a turbine, the method comprising:
   providing an ash bearing fuel comprising less than 0.5 ppm vanadium by weight, and at least one of greater than about 25 ppm ash by weight, and greater than zero ppm ash by weight and greater than 2 ppm calcium by weight;
   providing an additive comprising a magnesium compound;
   mixing the ash bearing fuel and the additive wherein a resulting weight ratio of magnesium to ash is greater than about 0.5 to 1; and
   burning the mixture of the ash bearing fuel and the additive in the turbine.

22. The method of claim 21 wherein the ash bearing fuel comprises greater than about 25 ppm ash by weight and greater than 2 ppm calcium by weight.

23. The method of claim 21 wherein the ash bearing fuel comprises greater than 50 ppm ash by weight.

24. The method of claim 21 wherein the ash bearing fuel comprises greater than 10 ppm calcium by weight.

25. The method of claim 21 wherein the ash bearing fuel comprises less than 1 ppm sodium and potassium combined by weight.

26. The method of claim 22 wherein the weight ratio is less than about 3 to 1.

27. The method of claim 22 wherein the weight ratio is about 1 to 1.

28. The method of claim 21 wherein the mixing the ash bearing fuel and the additive comprises mixing the ash bearing fuel and the additive so that the mixture has between about 10 ppm and about 1,500 ppm magnesium by weight.

29. The method of claim 28 wherein the mixing the ash bearing fuel and the additive comprises mixing the ash bearing fuel and the additive so that the mixture has between about 25 ppm and about 250 ppm magnesium by weight.

30. The method of claim 21 wherein the ash bearing fuel comprises ash comprising substantially calcium, iron, and nickel.

31. The method of claim 21 wherein the magnesium compound comprises at least one of magnesium sulfonate compound and a magnesium sulfate compound.

32. The method of claim 21 wherein the ash bearing fuel comprises a liquid petroleum based fuel.

33. A method for extending the time between turbine washes when burning ash bearing fuel in a turbine, the method comprising:
   providing an ash bearing fuel having less than 0.5 ppm vanadium by weight, less than 1 ppm sodium and potassium combined by weight, and at least one of greater than about 25 ppm ash by weight, and greater than zero ppm ash by weight and greater than 2 ppm calcium by weight;
   providing an additive comprising a magnesium compound;
   mixing the ash bearing fuel and the additive so that a weight ratio of the magnesium to ash is greater than about 0.5 to 1; and
   burning the mixture of the ash bearing fuel and the additive in the turbine.

34. The method of claim 33 wherein the ash bearing fuel comprises greater than about 25 ppm ash by weight and greater than 2 ppm calcium by weight.

35. The method of claim 33 wherein the ash bearing fuel comprises greater than about 50 ppm ash by weight.

36. The method of claim 33 wherein the ash bearing fuel comprises greater than 10 ppm calcium by weight.

37. The method of claim 33 wherein the weight ratio is less than about 3 to 1.

38. The method of claim 33 wherein the weight ratio is about 1 to 1.

39. The method of claim 33 wherein the ash bearing fuel comprises. ash comprising substantially calcium, iron, and nickel.

40. The method of claim 33 wherein the magnesium compound comprising at least one of a magnesium sulfonate compound and a magnesium sulfate compound.

* * * * *

UNITED STATES PATENT AND TRADEMARK OFFICE
CERTIFICATE OF CORRECTION

PATENT NO. : 6,632,257 B1  Page 1 of 1
DATED : October 14, 2003
INVENTOR(S) : Feitelberg et al.

It is certified that error appears in the above-identified patent and that said Letters Patent is hereby corrected as shown below:

<u>Column 8,</u>
Lines 8 and 10, delete "22" and insert therefor -- 21 --.

Signed and Sealed this

Eleventh Day of October, 2005

JON W. DUDAS
*Director of the United States Patent and Trademark Office*